(No Model.)
T. SHEHAN.
SEWER GAS AND STENCH TRAP.
No. 335,967. Patented Feb. 9, 1886.
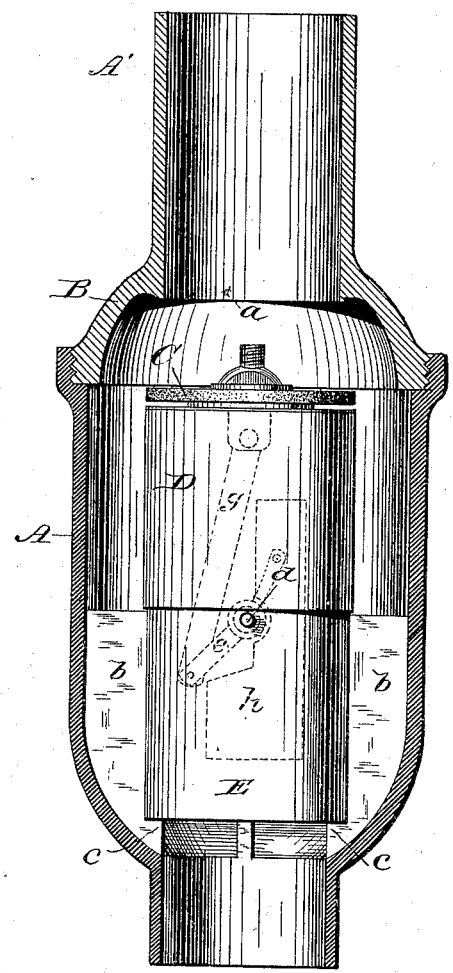
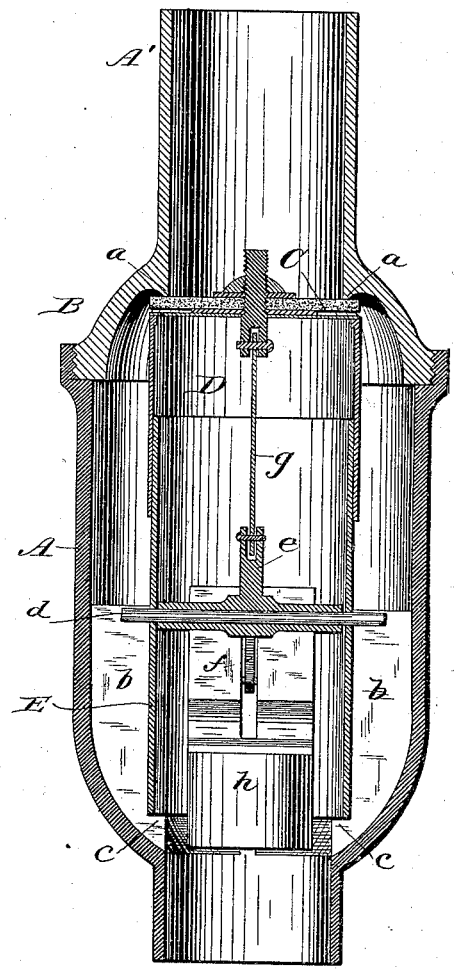

UNITED STATES PATENT OFFICE.

THOMAS SHEHAN, OF CLEVELAND, OHIO.

SEWER GAS AND STENCH TRAP.

SPECIFICATION forming part of Letters Patent No. 335,967, dated February 9, 1886.

Application filed December 21, 1885. Serial No. 186,339. (No model.)

*To all whom it may concern:*

Be it known that I, THOMAS SHEHAN, of the city of Cleveland, in the State of Ohio, have invented certain new and useful Improvements in Sewer Gas and Stench Traps, of which the following is a specification.

The object of my invention is to prevent the backflow of noxious gases in soil and sewer and other waste pipes. In the trap which I have invented for this purpose there is a direct water-way, which reduces to a minimum the liability of the clogging or stopping up of the trap, while at the same time the trap-valve is so arranged and the valve movement or mechanism is so inclosed that the water or liquid passing through the trap cannot choke or impede the working of said parts. The valve I make use of is a balanced valve, which normally stands in position to close the water-inlet, but which will yield and open in the presence of superincumbent pressure, so as to permit the passage of liquid which may gather in the inlet-pipe. The mechanism for balancing the valve is inclosed in a tube supported in the trap, and the valve itself is attached to the closed upper end of a second tube or sleeve, which is arranged and adapted to slide upon the tube first named. In this way I inclose the "valve-movement" in a chamber, which shields it from the direct action of liquid entering the trap, and prevents it from coming in contact with any solid matter that may be carried by the liquid. At the same time, however, the valve, as above stated, normally stands in such position as to be against its seat, thus closing the inlet, unless depressed by a superior force or pressure acting through the inlet-pipe; and inasmuch as the chamber in which the valve-movement is contained is open at its lower end, any back-pressure due to backflow of gases, &c., will act through the chamber against the head or closed upper end of the sliding valve-carrying sleeve, and will force said sleeve in a direction to bring the valve even more tightly against its seat, thus effectually sealing the inlet against the backflow therethrough of any gases.

The nature of my invention and the manner in which the same is or may be carried into effect will be understood by reference to the accompanying drawings, in which—

Figure 1 is a vertical central section of the body of the trap, with the valve, its supporting-sleeve, and the tube on which said sleeve slides represented in elevation. Fig. 2 is a vertical central section of the whole trap.

The body of the trap is preferably constructed, as shown, of two parts—the lower or main section, A, and the upper removable section, B, united with the lower section by a tight screw-joint. This arrangement permits the trap to be conveniently opened in order to remove, replace, or adjust the valve and parts pertaining thereto.

A is the inlet-pipe, connected to the trap by a screw-coupling, as shown, or in any suitable way. The outlet is at the opposite end of the trap.

Within the upper section, at a suitable point, is formed the annular valve-seat $a$. The valve is shown at C. Its structure obviously may vary. It is, however, conveniently formed of a disk of vulcanized rubber or rubber compound of a size sufficient to fit against the valve-seat $a$, and to close the inlet-opening which said seat surrounds. The valve is attached to and carried upon the head or closed upper end of a sleeve, D, which is mounted and adapted to slide up and down upon a stationary tube or barrel, E, open at both ends and secured in position in any suitable way within the body of the trap. In this instance it is held between three guide-ribs, $b$, cast on the interior of the part A, and rests at its bottom on shoulders $c$ of said ribs. The stationary barrel or tube and the sliding sleeve virtually form a longitudinally-extensible chamber closed at its upper end, or end nearest the inlet, and it is in this chamber that I inclose the movement or mechanism for balancing the valve. Various forms of such mechanism can be employed. That which I consider on the whole to be simplest, and at the same time most efficient, is shown in Fig. 2. It consists of a rock-shaft, $d$, mounted in and crosswise of the stationary barrel E. This shaft is in effect a crank-shaft, it being provided with two radial arms, $ef$, projecting from opposite sides. The one arm, $e$, is connected to the top of the sliding sleeve through the intermediary of a connecting-rod, $g$, jointed at one end to the arm, and at the other end to the head of a sleeve.

To the other arm is pivoted or jointed the counter-weight h, which is of sufficient weight to normally hold the valve up against its seat, thus closing the inlet, but not sufficiently heavy, however, to keep the inlet closed against any very material accumulation of water in the inlet-pipe. In fact the valve may be said to be very nearly balanced. I remark at this point that the inlet-pipe at any point may be provided with a water-seal, if desired.

Slops or other liquid passing down through the inlet-pipe will, by its pressure, depress the valve, and through the opening thus formed will pass into and down through the trap, there being, as seen, a direct water-way from the inlet to the outlet around the chamber which contains the valve-movement. The latter, however, is thoroughly shielded from the direct action of inflowing liquid, and is protected from solid matter contained in said liquid, which otherwise might catch and gather upon the moving parts of the mechanism with the effect of clogging, and indeed preventing, their operation.

Having now described my improvements and the best way known to me of carrying the same into effect, I state in conclusion that I do not restrict myself to the specific details of construction hereinbefore described in illustration of my invention, for manifestly the same can be considerably varied in a number of particulars without material departure therefrom; but

What I claim herein as new and of my own invention is—

1. The combination, with the trap body provided with a valve-seat and inlet and outlet openings, of the longitudinally-extensible chamber, the valve carried thereby, and the valve-counterweighting mechanism mounted and contained therein, substantially as and for the purposes hereinbefore set forth.

2. The trap-body provided with a valve-seat and inlet and outlet openings, in combination with the stationary barrel, the sliding sleeve mounted thereon, and the valve mounted on and carried by said sleeve, substantially as and for the purposes hereinbefore set forth.

3. The combination, with the body of the trap and the valve-seat contained therein, of the extensible chamber consisting of the stationary barrel and the sliding sleeve mounted thereon, the valve carried by said sliding sleeve, the counter-weight, and the rock-shaft mounted within the stationary barrel, and connected on the one hand to the valve-carrying sleeve and on the other hand to the counter-weight, substantially as and for the purposes hereinbefore set forth.

4. The trap-body formed with a removable upper section provided with a valve-seat, in combination with the valve, the valve-movement, and the extensible chamber carrying said valve containing the valve-movement, and detachably connected to the interior of the trap-body, substantially as and for the purposes hereinbefore set forth.

In testimony whereof I have hereunto set my hand this 15th day of December, A. D. 1885.

THOMAS SHEHAN.

Witnesses:
JOHN P. GREEN,
GEORGE P. PHIBBS.